June 3, 1958 J. HALTENBERGER 2,837,018
AUTOMOBILE GLASS TRANSPARENCY DEVICE
Filed Dec. 2, 1955
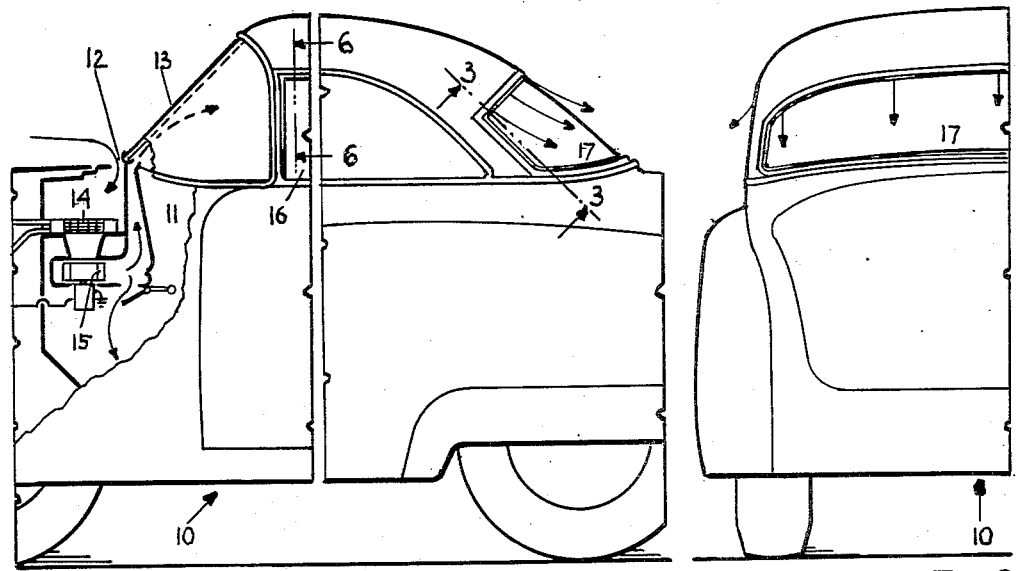
INVENTOR.

2,837,018
Patented June 3, 1958

2,837,018

AUTOMOBILE GLASS TRANSPARENCY DEVICE

Jules Haltenberger, Rancho Santa Fe, Calif.

Application December 2, 1955, Serial No. 550,606

1 Claim. (Cl. 98—2)

The present invention pertains to transparency of automobile windows, and is an extension of my co-pending patent application Ser. No. 157,733 filed on April 24, 1950, for Automobile Glass Defrosting and Drying, and to be issued on Dec. 6, 1955 as U. S. Patent No. 2,725,605. This application is also related to my co-pending application Ser. No. 446,541 filed Nov. 3, 1954, for Automobile Glass Transparency Control (now abandoned).

Automobiles of the closed body type repeatedly encounter relative temperature conditions that befog the body interior surfaces and/or befrost the outsides thereof.

The air pressure in closed bodies is usually higher than the ambient atmosphere, this excess is produced by air ram that enters into the body at the base of the usual windshield, and/or by the air circulating electric blower that forms a part of the air conditioning system. By allowing the higher pressure moisture laden air to escape, preferably over the top of the rear window, glass interior fogging is reduced, and such escaping air blows away falling rain or snow and melts away frost, snow, or ice deposits on the outer surface of the usually angularly disposed rear window.

Allowing body interior air to pass over the rear window outside surface is not new per se, all proposed methods that applicant is aware of, include changes in the construction of the usual automobile body roof structures, and include ducts or passages adjacent the ambient air where the interior air is cooled, whereas warm air blast on the rear window is desired, for quicker glass defrosting and drying.

The replaceable rear window, in all automobiles that applicant is aware of, is anchored in a yielding endless U channel of rubber like material, having an inner lip, arranged to surround and hug a continuous wall (often referred to as pinchweld) extending inwardly from the body rear window opening frame.

It is here proposed, and is the object of my invention, to provide from the body interior a narrow air passage of substantially full width of the automobile body and terminating at the rear window top outer surface, and dispose such passage wholly or in part in the top portion of the usual rear window holding yielding endless U channel, whereby, the present day usual roof construction and the very expensive dies to manufacture same, are not interfered with. Whereby, the heated body interior air when escaping through said narrow space, blows away falling rain or snow melts away snow or ice from the upper outside surface of the window.

A further object is, to provide for a rear window top part a spaced intermediate inverted U channel to be inserted into the upper portion of the rear window holding yielding endless U channel, whereby automobiles now in use can be provided with glass defroster and dryer, without any alteration in the usual roof or rear window glass construction and in the preferred form without an alteration in the usual yielding channel, for re-use of same with glass defrosting and drying.

A further object is, to provide the elements of the above objects to a side window of an automobile.

Further objects will appear as the description proceeds.

Referring to the drawings: Fig. 1 is a fragmental side elevation of the major part of an automobile; Fig. 2 an end elevation of Fig. 1; Fig. 3 is a section substantially on line 3—3 of Fig. 1, here illustrated in a somewhat larger scale; Fig. 4 is a section substantially on line 4—4 of Fig. 3; Fig. 5 is a modification of the upper part of Fig. 3, here shown in a larger scale; Fig. 6 is a section substantially on line 6—6 of Fig. 1, here shown in the scale used Figs. 3 and 4.

Referring to Figs. 1 to 4 inclusive, it will be seen, that a usual automobile closed type body generally at 10, has a body interior space 11, which is replenished by outside air through air inlet passage 12, disposed at the base of a usual windshield 13, wherefrom the air passes through an air cooling or heating air conditioner 14 and (stationary or power rotated) sirocco fan 15, and enters into the body interior space, in the usual well known manner.

The body is provided with side windows 16, and a substantially body full width slanted rear window glass or substitute thereof 17. The edges of this glass are nested into a yielding endless U channel having a bottom part 18, side parts 19 and top portion 20. The bottom portion of the glass channel is secured in a large opening in the rear part of the body formed by a window frame 21 having an inwardly extending rear window locating continuous wall 22. This wall is overlapped by portion 18' of the channel and this portion of the channel is secured to body by belt molding 23 and reveal molding 24, and garnish molding 25, in the usual well known manner.

The endless channel side parts 19, hold the respective side edges of the rear window, and except for the belt molding, this part of channel is secured similarly as the bottom portion. Inasmuch as all automobiles that applicant is aware of provide similar fastenings, it is believed that the disclosures in Fig. 4 will suffice, where the channel part 19, a part of reveal molding 24' and a part of garnish molding 25' are indicated.

The top part 20 of the channel is held by reveal molding 24" and garnish molding 25". This top part of the channel as by portion 20' overlaps and hugs wall 22 in the usual well known manner.

Here, however, the upper edge of the rear window is provided with an intermediate inverted U channel or substantially rigid strip 26, having an inner bottom wall and a slightly out-turned air scooping lip 27 thereon, and an outer bottom wall having a slightly in-turned air metering lip 28, these walls and their interconnecting wall inner sides being provided with air narrow passage assuring inward protrusions 29. This U channel or strip is sealed into the upper part of the yielding U channel.

As is clear from the drawings, the body interior usually heated and moisture laden air, is allowed to escape by the pressure differential of the air pressure in the body and less than ambient air pressure in the neighborhood of the air outlet (when the vehicle is in motion). This method of glass interior drying and rear window outside defrosting is inexpensive, and does not alter the present body construction, the escaping air hugs the inside and top outside of the rear window without contacting the roof outer skin where it might lose its desired heat contents. It is applicable to automobiles now in use by the mere insertion addition of a spaced relation holding intermediate U channel or substantially rigid strip on the top part of the rear window, and re-assembly of the demounted parts in their previous positions.

When it is desired to close the body interior air escape, this is illustrated in Fig. 5, wherein between the glass outer surface and metering lip 28' inner edge an air passage sealing flexible wedge spring 30 is inserted, or removed when air escaping is desired. This figure also illustrates on the air outlet side bottom wall two instead of one air passage assuring protrusions 29', to assure a more exact predetermined narrow air escape passage. Here, the top edge of the glass is covered by an inverted U channel 31 on which the protrusions are seated (instead of directly on the glass).

The U channel 31 is supported by the top edge of the rear window and it transfers all the heat it receives from the body interior only to the glass or to the escaping air.

This invention is not limited to the rear window, an application to a side window having a frame 21' is illustrated in Fig. 6, where the corresponding parts have identical indicating numerals, but provided with an additional prime.

While I have herein shown and described only certain specific embodiments of my invention and have suggested only certain possible modifications, it will be appreciated that many changes and variations can be made to suit particular conditions and embodiments of use, without departing from the spirit and scope of my invention.

What applicant claims as his invention:

In a motor vehicle, a rear window frame, an endless yieldable channel secured in said frame and having a bottom, two sides and a top, a rearwardly downwardly inclined rear window having its bottom and side edges nested in the bottom and sides of said channel, said top of the channel having a downwardly rearwardly opening recess extending longitudinally thereof, the walls of the recess being U-shaped in transverse cross-section, a rigid strip secured in the recess in contact with the walls of the recess and having a U-shaped cross-section complementary to said cross-section of the walls of the recess, the top edge of said rear window being disposed within the confines of said strip, and means on the inner sides and bottom walls of the rigid strip projecting inwardly to space the top edge of the rear window from the rigid strip to define a U-shaped exit passage for heated air from within the motor vehicle so that when the vehicle is in forward motion there will be a region of reduced pressure outside the top of the rear window toward which heated air will flow from within the vehicle through said exit passage to remove rain, snow and ice from the upper outside surface of the rear window.

References Cited in the file of this patent

UNITED STATES PATENTS

| 2,040,306 | Hamm | May 12, 1936 |

FOREIGN PATENTS

| 818,907 | Germany | Oct. 29, 1951 |